(No Model.) 2 Sheets—Sheet 2.
T. NUGENT.
AIR HEATER.
No. 403,064. Patented May 7, 1889.
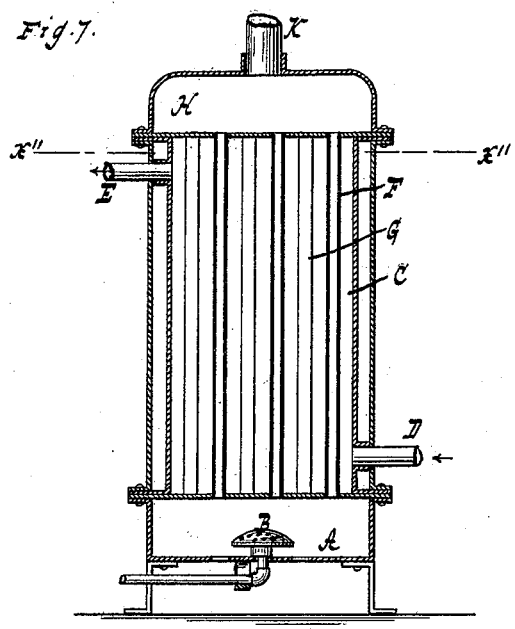
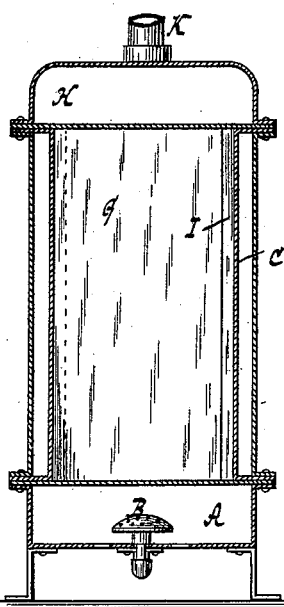
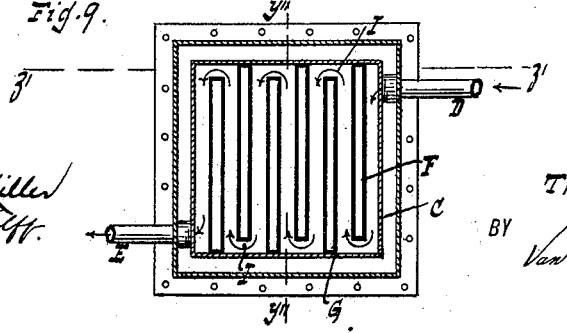
WITNESSES:
William M. Miller
Edward Wolff
INVENTOR:
Thomas Nugent
BY
Van Santvoord & Hauff
ATTORNEY

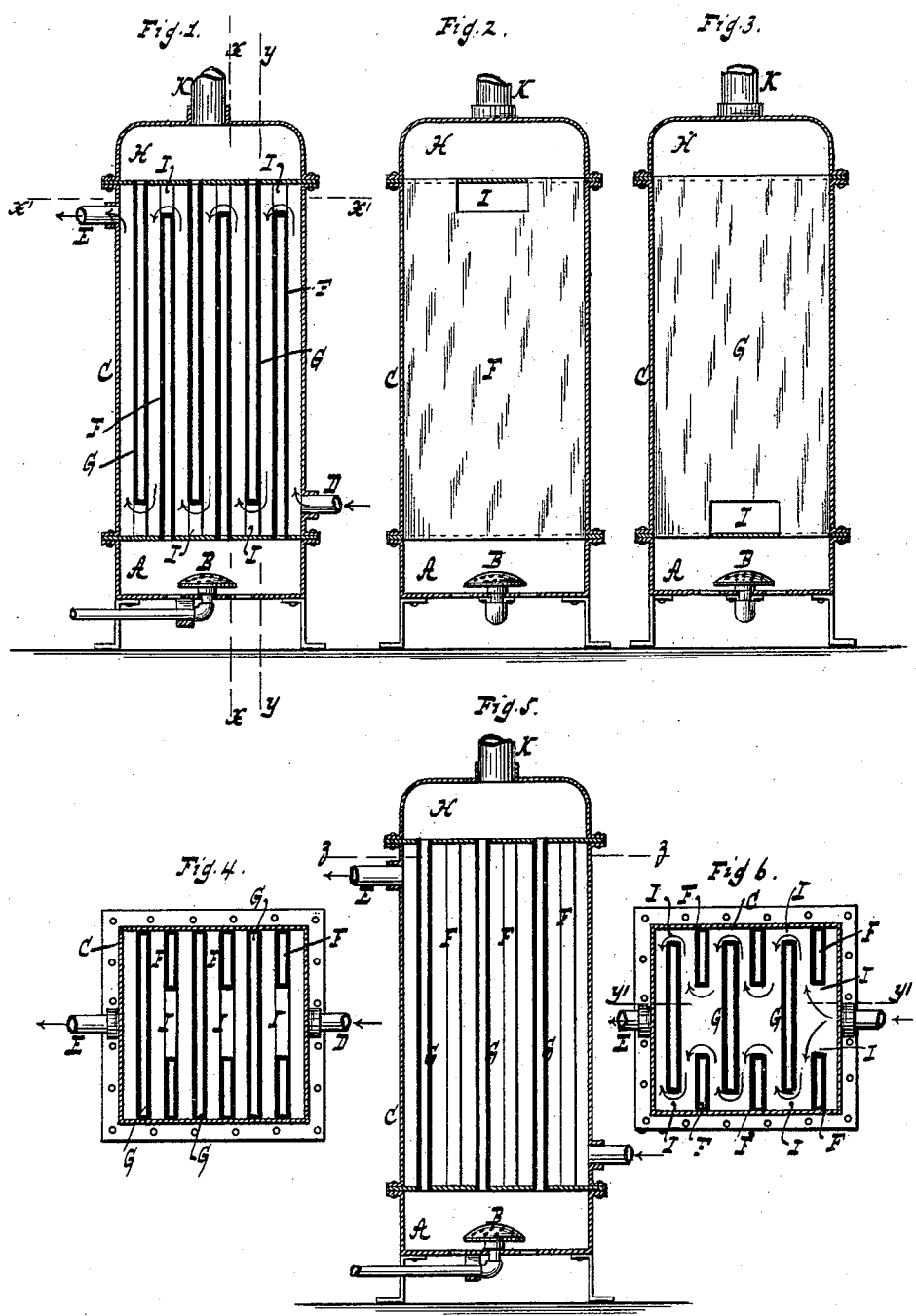

UNITED STATES PATENT OFFICE.

THOMAS NUGENT, OF NEW YORK, N. Y.

AIR-HEATER.

SPECIFICATION forming part of Letters Patent No. 403,064, dated May 7, 1889.

Application filed January 3, 1889. Serial No. 295,285. (No model.)

*To all whom it may concern:*

Be it known that I, THOMAS NUGENT, a citizen of the United States, residing at New York, in the county and State of New York, have invented new and useful Improvements in Air-Heaters, of which the following is a specification.

This invention relates to an improvement in air-heaters, by which the air is caused to take a circuitous route through the heater in close proximity to the source of heat, so that the air will be thoroughly heated, as set forth in the following specification and claim, and illustrated in the accompanying drawings, in which—

Figure 1 is a transverse sectional view of a heater. Fig. 2 is a section along the line $x\,x$, Fig. 1. Fig. 3 is a section along the line $y\,y$, Fig. 1. Fig. 4 is a section along the line $x'\,x'$, Fig. 1. Fig. 5 is a view similar to Fig. 1, showing a modification in section along the line $y'\,y'$, Fig. 6. Fig. 6 is a section along the line $z\,z$, Fig. 5. Fig. 7 is a view similar to Fig. 1, showing a modification in section along the line $z'\,z'$, Fig. 9. Fig. 8 is a section along the line $y''\,y''$, Fig. 9. Fig. 9 is a section along the line $x''\,x''$, Fig. 7.

Similar letters indicate corresponding parts.

In the drawings, the letter A indicates a fire-place having a suitable source of heat, B, such as a burner. The air is heated in the heating-chamber C, which has an air-inlet pipe, D, and an air-outlet pipe, E. The products of combustion pass through the hollow partitions or radiators F G of the heating-chamber and into the chamber H, whence said products pass off through the escape or chimney K. The partitions F G are thus thoroughly heated by the products of combustion, so that the air in the heating-chamber on striking against said partitions is thoroughly warmed.

The partitions are provided with alternating air-passages I, the air-passage I of the partitions F, Fig. 1, being located at the upper part of the heating-chamber, while the air-passages of the partitions G are located at the lower part of the heating-chamber. The air entering at the inlet D is thus compelled to take an alternating or circuitous route through the heating-chamber in order to pass out at the outlet E, and said air by its contact with the hollow heated partitions or radiators F G is thoroughly warmed in its passage through the heating-chamber.

Instead of alternately locating the passages I at the upper and lower part of the heating-chamber, said passages I may be caused to alternate along the sides of the heating-chamber, as indicated in Figs. 5 and 6 and in Figs. 8 and 9. The partitions I, as seen, are oblong or elongated, so as to furnish an extensive heated surface against which the air in the heating-chamber strikes, so as to become thoroughly warmed.

In Figs. 1 to 6 the wall of the heating-chamber C is shown single. By having said wall double, as shown in Figs. 7 to 9, the heat can be more thoroughly prevented from radiating from the wall of the chamber C.

What I claim as new, and desire to secure by Letters Patent, is—

An air-heater consisting of the air-heating chamber C, having at its base a burner or other source of heat separated from such chamber by a partition, an air-inlet, D, an air-outlet, E, an escape or chimney, K, and a series of vertical hollow partitions arranged in the heating-chamber and providing the alternating air-passages for compelling the air to be heated to traverse a zigzag circuit, said hollow partitions being open at both ends for conducting the products of combustion from the combustion-chamber to the chimney, substantially as described.

In testimony whereof I have hereunto set my hand and seal in the presence of two subscribing witnesses.

THOMAS NUGENT. [L. S.]

Witnesses:
W. C. HAUFF,
E. F. KASTENHUBER.